United States Patent [19]

Sugimoto

[11] Patent Number: 5,052,744
[45] Date of Patent: Oct. 1, 1991

[54] SLIDE ROOF SYSTEM FOR A VEHICLE
[75] Inventor: Norihide Sugimoto, Wako, Japan
[73] Assignee: Honda Giken Hogyo Kabushiki Kaisha, Tokyo, Japan
[21] Appl. No.: 407,509
[22] Filed: Sep. 14, 1989
[30] Foreign Application Priority Data Sep. 14, 1988 [JP] Japan .................. 63-120968[U]
Sep. 14, 1988 [JP] Japan .................. 63-120969[U]

[51] Int. Cl.$^5$ .................. B60J 7/00; B60J 7/22
[52] U.S. Cl. .................. 296/213; 296/217
[58] Field of Search .................. 290/213, 216, 217, 223

[56] References Cited
U.S. PATENT DOCUMENTS 3,016,263 1/1962 Rehmann .................. 296/216
4,892,351 1/1990 Ono et al. .................. 296/213

FOREIGN PATENT DOCUMENTS 0215422 9/1988 Japan .................. 296/223

Primary Examiner—Dennis H. Pedder
Attorney, Agent, or Firm—Skjerven, Morrill Macpherson, Franklin & Friel

[57] ABSTRACT

In a slide roof system, guide rail stays are provided with engagement portions for securing a trough member, onto an inner frame, for receiving rain water which may drip from the slide roof panel. Since the guide rail stays are provided externally of the trough member which extends along the periphery of the opening of the inner frame, there are no sealing necessities for the trough member which may be made of an integral member made of synthetic resin. According to a preferred embodiment, a base member of a spring-loaded, retractable air deflector unit is provided with a longitudinal projection at its front end so as to be received by an engagement hole provided in a lateral piece extending from a part of the guide rail stays into the groove defined by a trough member, and an extension at its rear end which extends rearwardly over a rear end of the expanded portion of the trough member and fixedly secured to the inner frame by means of an engagement between a longitudinal slot and a threaded bolt and nut. Thus, a low-profile design of the slide roof system is made possible without creating any problems in regards to the sealing of the trough member and the ease of fabrication of the slide roof system.

10 Claims, 3 Drawing Sheets

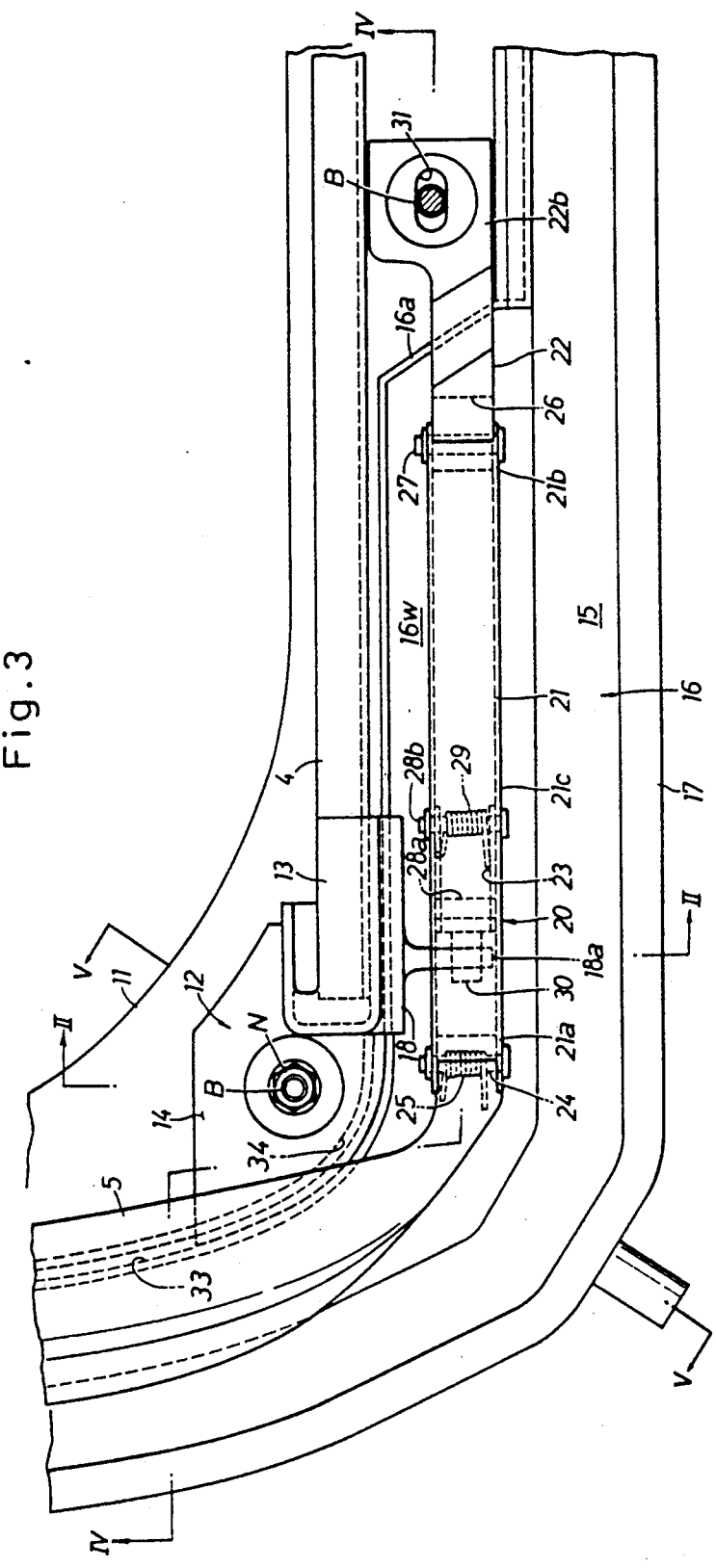
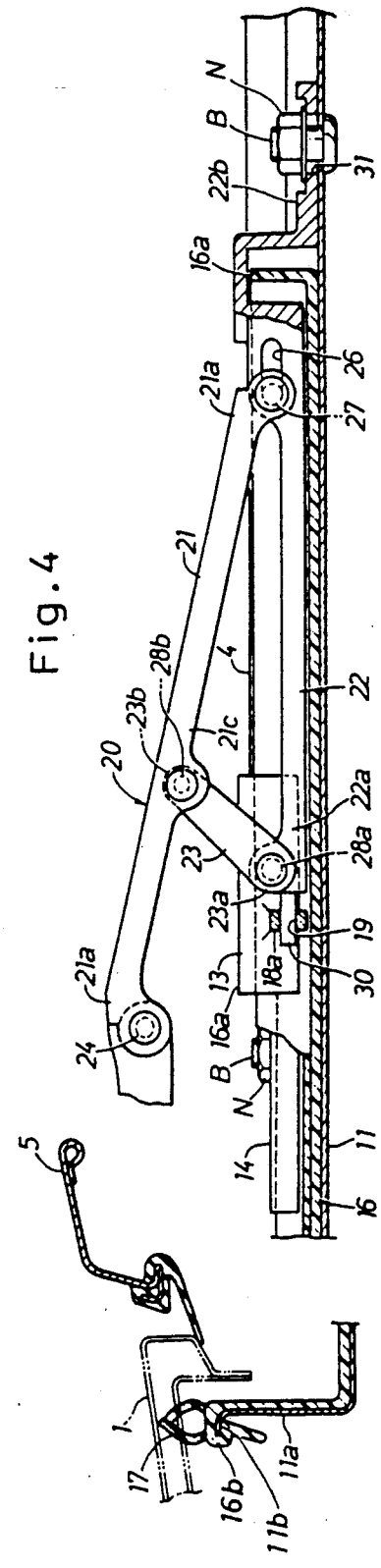
Fig. 3
Fig. 4

SLIDE ROOF SYSTEM FOR A VEHICLE

TECHNICAL FIELD

The present invention generally relates to a slide roof system for a vehicle, and in particular to a slide roof system provided with improved means for securing the water trough structure of the slide roof system for guiding rain water to keep it away from the mechanism of the slide roof and the passenger compartment. The present invention is also related to a slide roof system provided with an air deflector unit which permits a low-profile design of the slide roof system without interfering with its water trough structure.

BACKGROUND OF THE INVENTION

Vehicle slide roofs are widely used on automobiles in the form of a steel or glass plate which is slidably and/or tiltably disposed on an opening provided in the roof panel of the vehicle. The mechanism for actuating and guiding the slide roof is usually mounted on an inner frame which is attached to the lower surface of the fixed roof panel in a spaced relationship. The inner frame is provided with an opening which is slightly smaller than the opening of the fixed roof panel, and defines a water trough along the periphery of the opening to receive possible dripping of water from the periphery of the slide roof panel.

To minimize the vertical dimension of the mechanism for actuating and guiding the slide roof panel and prevent rusting by keeping metallic parts away from contact with water, it is proposed to use a separate trough member made of synthetic resin along the part of the inner frame peripheral to the opening as disclosed in U.S. Pat. No. 4,892,351, issued on Jan. 9, 1990.

In such a slide roof system, the trough member must be securely attached to the inner frame since the trough member is made of synthetic resin material and may warp or otherwise deform in time. In particular, it is preferred not to open any hole in the trough member itself to avoid additional sealing necessities. The use of a bonding agent should be avoided in order to ensure a high level of reliability over the entire service life of the slide roof system. Thus, it is difficult to securely fix the trough member onto the inner frame without using complex mechanical structures.

Also, it is customary to use an air deflector to prevent generation of air turbulences and air noises, for instance as disclosed in Japanese utility model publication No. 57-16735. Typically, such an air deflector is spring-loaded in such a manner that it may be retracted by closing movement of the slide roof against the spring force of a spring member which tends the air deflector toward its fully extended position.

To avoid interference between the trough member and the air deflector mechanism without obstructing the open space defined by the opening, it is preferred to place the base portion of the air deflector mechanism inside the trough member. However, to securely attach the base member located in the trough member to the inner frame, it is necessary to pass bolts through the trough member and fasten them. This in turn requires seals for the holes provided in the trough member to avoid leaking of water and corrosion of metallic parts.

BRIEF SUMMARY OF THE INVENTION

In view of such problems of the prior art, a primary object of the present invention is to provide a slide roof system which is provided with means to securely attach the trough member to the inner frame without unduly complicating its structure.

A second object of the present invention is to provide a slide roof system which is provided with an air deflector unit which permits low profile design of the slide roof system and is free from any complicated sealing arrangements.

A third object of the present invention is to provide a slide roof system which permits easy and secure mounting of an air deflector unit.

A fourth object of the present invention is to provide a slide roof system which permits adjustment of the mounting position of the air deflector unit.

These and other objects of the present invention can be accomplished by providing: a slide roof system for a vehicle, comprising: an opening defined in a fixed roof panel of the vehicle; an inner frame fixedly secured under the fixed roof panel and provided with an opening which is at least partly coextensive with the opening, defining a space between a part of the fixed roof panel peripheral to the opening of the fixed roof panel and an inner peripheral part of the inner frame; a moveable roof panel disposed on the opening of the fixed roof panel so as to be moveable between an open position and a closed position by being actuated by a slide roof actuating unit disposed in the space and guided by a pair of guide rails mounted on the inner frame so as to extend longitudinally of the vehicle on either side of the opening of the inner frame; a trough member received in the space to receive possible dripping of water from a peripheral part of the opening of the fixed roof panel; and a guide rail stay securing a front end of each of the guide rails onto the inner frame outside of the trough member.

Thus, the trough member may be conveniently secured without requiring any special fastening means and without opening any holes in the trough member itself. Therefore, the assembling process is in no way made any more complicated, the vertical dimension of the slide roof system is not increased, and the trough member can be positively secured with a high level of reliability. In particular, since the guide rail stays are provided externally of the trough member which extends along the periphery of the opening of the inner frame, there are no sealing necessities for the trough member which may be made of an integral member made of synthetic resin.

This securing action may be achieved for instance by providing, at a lower part of the external surface of at least a part of the inner wall of the trough member, an extension which is adapted to be clamped to the inner frame by a part of the guide rail stay and/or by providing, on an inner circumferential surface of the trough member, engagement means which cooperates with associated engagement means provided on an outer circumferential surface of the guide rail stay. This is particularly meaningful when it is applied to a corner portion of the trough member which is most prone to warping. The outer wall of the trough member may be provided with an engagement bead portion which is adapted to be engaged with an upper edge of a vertical wall defined in the inner frame.

According to a particularly preferred embodiment of the present invention, the slide roof system comprises an air deflector unit disposed in a front part of the space to be retracted by closing movement of the moveable roof panel and lifted by opening movement of the moveable roof panel the air deflector unit comprising a base member received in a laterally expanded portion of the trough member and fixedly secured therein, an arm member pivotally supported by the base member at its base end, a deflector blade carried by a free end of the arm member, and means for synchronizing the movement of the air deflector unit with the movement of the moveable roof panel; the base member being provided with a longitudinal projection at its front end so as to be received by an engagement hole provided in a lateral piece extending from a part of the guide rail stay into a groove defined by the trough member, and an extension at its rear and which extends rearwardly over a rear end wall of the expanded portion of the trough member and fixedly secured to the inner frame by means of an engagement between a longitudinal slot, and a threaded bolt and nut. Preferably, the projection is longer than the slot to facilitate the positional adjustment of the base member of the air deflector unit.

To favorably support the base member of the air deflector unit without opening any holes in the trough member and, hence, without giving rise to seal problems, the lateral piece may be provided with a first part extending above the upper edge of an inner wall portion of the trough member, a depending portion depending from the free end of the first part along the inner surface of the inner wall portion, and a main part extending laterally from the depending portion into the groove and provided with the engagement hole.

Preferably, the lateral piece is integrally provided in a die-cast guide rail stay which secures a front end of a guide rail of the slide roof actuating unit.

BRIEF DESCRIPTION OF THE DRAWINGS

Now the present invention is described in the following in terms of a specific embodiment with reference to the appended drawings, in which:

FIG. 3 is a plan view of a part of the slide roof system;

FIG. 4 is a sectional view taken along line IV—IV of FIG. 3; and

DETAILED DESCRIPTION OF THE PREFERRED EMBODIMENT

Since the structure of the present invention is basically symmetric relative to a central longitudinal line of the vehicle body, only one side of the entire structure is described in some of the following disclosure.

Figure 1:
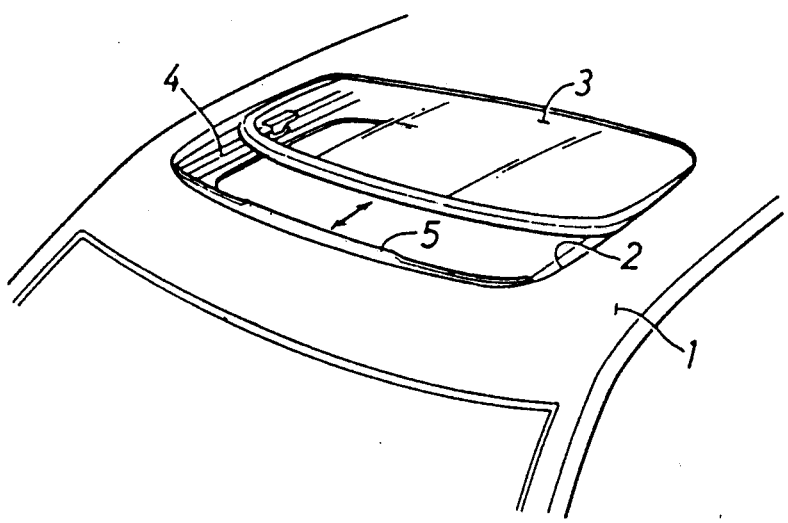
FIG. 1 is an external perspective view of a slide roof system to which the present invention is applied.

FIG. 1 shows a general external appearance of the slide roof system of the present invention. A rectangular opening 2 is defined in a front part of a fixed roof panel 1, and a moveable roof panel 3, typically made of a sheet of glass, is disposed on this opening 2 so as to selectively close it. The moveable roof panel 3 can slidingly move between a position to completely close the opening 2 and another position to completely expose the opening 2 along a pair of guide rails 4 extending longitudinally on either side of the opening 2. The front edge of the opening 2 is provided with a slightly curved deflector blade 5 so as to be moved vertically as the moveable roof panel 3 moves toward and away from its completely closed position.

Figure 2:
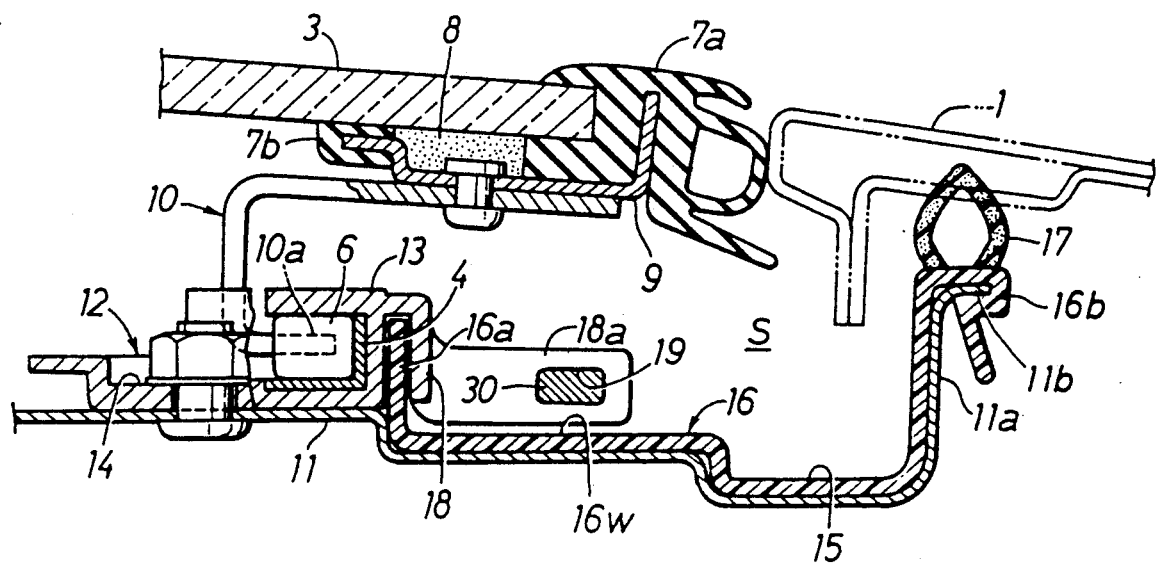
FIG. 2 is a sectional view taken along line II—II of FIG. 3.

Referring to FIG. 2, the peripheral part of the moveable roof panel 3 consists of a frame member 9 into which a sheet of glass is fitted by way of seal members 7a and 7b with the aid of a bonding agent 8. A pair of panel stays 10 depend from either side of a front part of the frame member 9. The lower end of each of the panel stays 10 is bent outwardly into the shape of letter L, and a slide shoe 6 made of TEFLON brand polytetrafluoroethylene (trademark) is fixedly attached to the free end 10a of the bent portion of each of the panel stays 10. The slide shoes 6 are slidable received in the guide rails 4 to guide the moveable roof panel 3 in the fore-and-aft direction.

The front end of each of the guide rails 4 is fixedly secured to an inner frame 11 extending horizontally under the fixed roof panel 1 by means of a guide rail stay 12 which is made of die-cast zinc alloy and consists of an engagement portion 13 receiving the front end portion of the guide rail 4 and a base portion 14 which is bolted to the inner frame 11.

The inner frame 11 is fabricated by stamping a sheet of steel plate, and is provided with a relatively low, vertical peripheral wall 11a extending over the entire periphery of the inner frame 11, defining a space S inside the fixed roof panel 1 from the front part of the inner frame 11 corresponding to the opening 2 and the rear part of the inner frame 11 for receiving the moveable roof panel 3 when it is retracted as described hereinafter.

A trough member 16 made of synthetic resin is placed on the inner peripheral part of the inner frame 11 opposing the inner surface of the fixed roof panel 1 so as to define a U-shaped groove 15 over the entire inner periphery of the inner frame 11. The outer edge of the trough member 16 is provided with an engagement bead portion 16b which is wrapped around a lateral flange 11b extending laterally and outwardly from the upper end of the vertical peripheral wall 11a. Further, a hollow seal member 17 made of rubber-like material is integrally attached to the upper surface of the engagement bead portion 16b of the trough member 16 to sealingly abut the inner surface of the fixed roof panel 1.

The front part of the trough member 16 is provided with expanded portions 16w expanded inwardly from either side of the opening 2 to define a space for accommodating an air deflector unit as described hereinafter. The inner end of the expanded portion 16w is provided with a vertical wall portion 16a to prevent intrusion of water into the passenger compartment.

The external end of the engagement portion 13 of the guide rail stay 12 is provided with a depending portion 18 depending from an upper extension of the engagement portion 13 defining a certain gap between the depending portion 18 and the external end of the engagement portion 13. The depending portion 18 extends along the inner surface of the vertical wall portion 16a of the expanded portion 16w of the trough member 16, receiving the vertical wall portion 16a in the aforementioned gap. A lateral piece 18a projects laterally from the external surface of each of the depending portion 18 and is provided with an engagement hole 19 for securing the air deflector unit as described hereinafter.

Now the air deflector unit 20 is described in the following with reference to FIGS. 3 and 4.

The air deflector unit 20 is provided with a deflector blade 5, a pair of arms 21 supporting the side ends of the deflector blade 5 at their front ends 21a, a pair of base members 22 each provided with a slot 26 at its rear end for receiving a pin 27 provided in the rear end 21a of the associated arm 21, a pair of intermediate links 23 each connecting the front end 22a of the associated base member 22 and an intermediate part 21c of the associated arm 21 by way of pivot pins 28a and 28b, respectively.

The front ends 21a of the arms 21 are coupled with the deflector blade 5 by way of pivot pins 24. A coil spring 25 is wound around each of the pivot pins 24 to urge the deflector blade 5 in clockwise direction as seen in FIG. 4 until the rear ends of the deflector blade 5 abut the associated front ends 21a of the arms 21 above the pivot pins 24.

Another coil spring 29 is wound around each of the pivot pins 28b so as to urge the front end 21a of the arm 21 away from the associated intermediate link 23.

Thus, when the moveable roof panel 3 is closed, the air deflector unit 20 is retracted in the space S defined between the moveable roof panel 3 and the inner frame 11. When the moveable roof panel 3 is opened by being slid backward, the deflector blade 5 rises up until its upper surface becomes substantially flush with the outer contour of the fixed roof panel 1.

Each of the expanded portions 16w of the trough member 16 terminates at a point slightly behind the middle point of the opening 2, and the parts of the trough member 16 extending to the rear from this point on define a simple U-shaped groove 15. The rear end 22b of each of the base members 22 goes over the vertical wall portion 16a in the region where the vertical wall portion 16a extends obliquely and terminates the expanded portion 16w and is bolted to the inner frame 11 at its rear most part by means of a slot 31 provided in the rear end of the base member 22 and a bolt B passed through a hole provided in the inner frame 11 and the slot 31. The front end of each of the base members 22 is provided with a longitudinal projection 30 which fits into the engagement opening 19 of the associated lateral piece 18a. The length of the longitudinal projection 30 is equal to or larger than the longitudinal length of the slot 31 so that the engagement between the hole 19 and the projection 30 may be maintained even when the relative position between the rear end of the base member 22 and the bolt B is adjusted within the range permitted by the slot 31.

Thus, the base member 22 may be mounted on the inner frame 11 by fitting the projection 30 into the opening 19 and then bolting the rear end of the base member 22 to the inner frame 11 by way of the bolt B, the slot 31 and a nut N threaded with the bolt B.

The front corner portions of the trough member 16 are each integrally provided with a conduit 32 consisting, for instance, of a vinyl tube, for rapidly expelling water received by the trough member 16. This area is a part of the expanded portion 16w of the trough member 16 which is provided for accommodating the air deflector unit 20. Therefore, this part of the trough member 16 tends to be less rigid than other parts, and the inner end of the trough member 16 may warp upwards.

Figure 5:
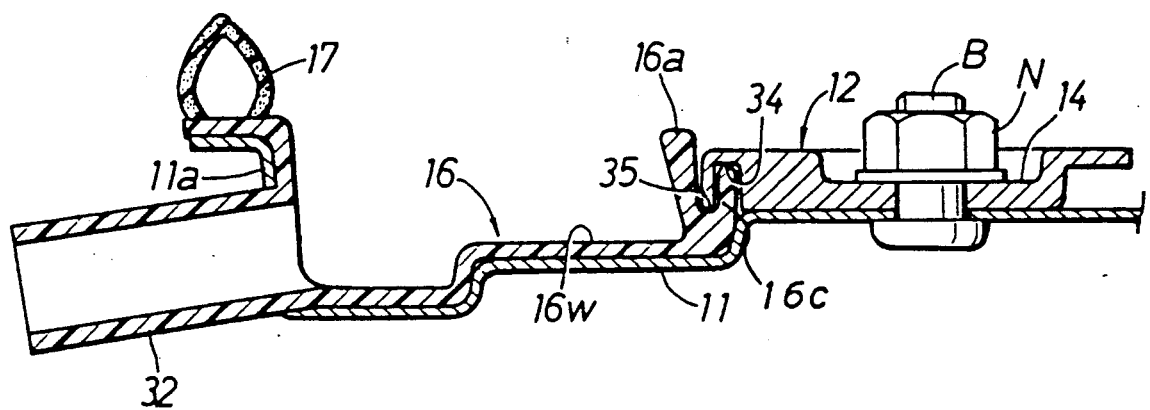
FIG. 5 is a sectional view taken along line V—V of FIG. 3.

To avoid this to happen, as best shown in FIG. 5, the base portions 14 of the guide stays 12 are curved so as to conform with the inner circumferential surface of the trough member 16, and grooves 35 and 34 are provided in the inner circumferential surface of the trough member 16 and the outer circumferential surface of the guide rail stays 12, respectively, so as to interlock one another. Further, a lower part of the inner circumferential surface of the trough member 16 is provided with a tab 16c which is adapted to be clamped by the guide rail stay 12 when it is bolted to the inner frame 11. Thus, once the guide rail stay 12 is fixedly secured to the inner frame 11, the trough member 16 is securely kept in position by mutual engagement of the grooves 35 and 34, and clamping of the tab 16c by the guide rail stay 12.

Thus, according to the present invention, secure attachment of the trough member to the inner frame is simplified. Also, since the warping of the trough member is positively prevented, its capability to guide water as well as its favorable appearance is ensured over the entire service life of the slide roof system.

Although the present invention has been shown and described with respect to a detailed embodiment, it should be understood by those skilled in the art that various changes and omission in form and detail may be made therein without departing from the spirit or scope of this invention.

What we claim is:

1. An improved slide roof system for a vehicle, comprising:
   an opening defined in a fixed roof panel of the vehicle;
   an inner frame disposed under said fixed roof panel and provided with an opening which is at least partly coextensive with said opening in said fixed roof panel, defining a space between a part of said fixed roof panel peripheral to said opening in said fixed roof panel and a part of said inner frame peripheral to said opening in said inner frame;
   a moveable roof panel disposed in moveable relationship with said opening in said fixed roof panel so as to be moveable between an open position and a closed position guided by a pair of guide rails mounted on said inner frame so as to extend longitudinally of said vehicle, one of said guide rails being disposed on either side of said opening in said inner frame;
   a trough member received in said space to receive possible dripping of water from a peripheral part of said opening in said fixed roof panel; and
   a guide rail stay securing a front end of each of said guide rails onto said inner frame outside of said trough member,
   wherein said improvement comprises:
   providing on said guide rail stay a depending portion which hooks over and secures a portion of said trough member to said inner frame without passing through said portion of said trough member.

2. A slide roof system for a vehicle according to claim 1, wherein at least a part of said portion of said trough member includes a vertical wall portion which includes a tab which is adapted to be clamped to said inner frame by said depending portion of said guide rail stay.

3. A slide roof system for a vehicle according to claim 2, wherein said extension of said trough member is provided in a corner portion of said trough member.

4. A slide roof system for a vehicle according to claim 1, wherein an outer wall of said trough member is provided with an engagement bead portion which is adapted to be engaged with an upper edge of a vertical wall defined in said inner frame.

5. A slide roof system for a vehicle according to claim 1, further comprising an air deflector unit disposed in a front part of said space to be retracted by closing movement of said moveable roof panel and lifted by opening movement of said moveable roof panel;

said air deflector unit comprising a base member received in a laterally expanded portion of said trough member and fixedly secured therein, an arm member pivotally supported by said base member at its base end, a deflector blade carried by a free end of said arm member, and means for synchronizing the movement of said air deflector unit with the movement of said moveable roof panel;

said base member being provided with a longitudinal projection at its front end so as to be received by an engagement hole provided in a lateral piece extending from a part of said guide rail stay into a groove defined by said trough member, and an extension at its rear end which extends rearwardly over a rear end wall of said expanded portion of said trough member and fixedly secured to said inner frame by means of an engagement between a longitudinal slot, and a threaded bolt and nut.

6. A slide roof system for a vehicle according to claim 5, wherein said projection is longer than said slot.

7. A slide roof system for a vehicle according to claim 5, wherein said lateral piece is provided with a first part extending above the upper edge of an inner wall portion of said trough member, the depending portion depending from the free end of said first part along the inner surface of said inner wall portion, and a main part extending laterally from said depending portion into said groove and provided with said engagement hole.

8. A slide roof system for a vehicle comprising:

an opening defined in a fixed roof panel of the vehicle;

an inner frame disposed under said fixed roof panel and provided with an opening which is at least partly coextensive with said opening in said fixed roof panel, defining a space between a part of said fixed roof panel peripheral to said opening of said fixed roof panel and a part of said inner frame peripheral to said opening of said inner frame;

a moveable roof panel disposed in moveable relationship with said opening in said fixed roof panel so as to be moveable between an open position and a closed position;

a trough member received in said space to receive possible dripping of water from a peripheral part of said opening of said fixed roof panel;

an air deflector unit disposed in a front part of said space to be retracted by closing movement of said moveable roof panel and lifted by opening movement of said moveable roof panel;

said air deflector unit comprising a base member received in a laterally expanded portion of said trough member and fixedly secured therein, an arm member pivotally supported by said base member at its base end, a deflector blade carried by a free end of said arm member, and means for synchronizing the movement of said air deflector unit with the movement of said moveable roof panel;

said base member being provided with a longitudinal projection at its front end so as to be received by an engagement hole provided in a lateral piece extending from a part of said guide rail stay into a groove defined by said trough member, and an extension at its rear end which extends rearwardly over a rear end wall of said expanded portion of said trough member and fixedly secured to said inner frame by means of an engagement between a longitudinal slot, and a threaded bolt and nut.

9. A slide roof system for a vehicle according to claim 8, wherein said lateral piece is integrally provided with a die-cast guide rail stay which secures a front end of a guide rail of said slide roof actuating unit.

10. A slide roof system for a vehicle according to claim 8, wherein said trough member includes a vertical wall portion and said lateral piece is provided with a first part extending above the upper edge of said vertical wall portion of said trough member, wherein said first part includes a depending portion depending from the free end of said first part and extending along an inner surface of said vertical wall portion, and wherein said lateral piece further includes a main part extending laterally from said depending portion into said groove and said main part is provided with said engagement hole.

* * * * *